United States Patent [19]
Prado et al.

[11] Patent Number: 5,483,594
[45] Date of Patent: Jan. 9, 1996

[54] METHOD AND DEVICE FOR ANALYSIS OF A RETURN SIGNAL AND ADAPTIVE ECHO CANCELLER INCLUDING APPLICATION THEREOF

[75] Inventors: Jacques Prado, Egly; Eric Moulines, Paris, both of France

[73] Assignee: France Telecom, Paris, France

[21] Appl. No.: 381,310

[22] Filed: Jan. 31, 1995

[30] Foreign Application Priority Data

Feb. 2, 1994 [FR] France ................................. 94 01160

[51] Int. Cl.[6] .............................. H04M 9/08; H04B 3/20
[52] U.S. Cl. ........................ 379/410; 379/406; 379/411; 370/32.1
[58] Field of Search ................................. 379/410, 406, 379/411, 388, 389, 390; 370/32.1

[56] References Cited

U.S. PATENT DOCUMENTS

| | | | |
|---|---|---|---|
| 4,360,712 | 11/1982 | Horna | 379/410 |
| 4,672,665 | 6/1987 | Nagai et al. | 379/411 |
| 4,697,261 | 9/1987 | Wang et al. | 370/32.1 |
| 4,712,235 | 12/1987 | Jones, Jr. | 379/410 |
| 4,736,414 | 4/1988 | Montagna et al. | 379/411 |
| 4,894,820 | 1/1990 | Miyamoto et al. | 379/410 X |
| 4,918,727 | 4/1990 | Rohrs et al. | 379/410 |
| 5,305,349 | 4/1994 | Dent | 375/1 |
| 5,307,405 | 4/1994 | Sih | 379/410 |
| 5,343,521 | 8/1994 | Jullien et al. | 379/410 |

OTHER PUBLICATIONS

IEEE Global Telecommunications Conference, vol. 3, Nov. 1984 "A Fast Adaptive Echo Canceller With Delay Estimation For Time Variant Telephone Circuits"—p. 1569—Montagna et al.

Hayashi et al., "Echo Canceller With Effective Double Talk Control", IEEE Global Telecommunications Conference, vol. 3, pp. 1389–1393, 1983.

*Primary Examiner*—Jeffery A. Hofsass
*Assistant Examiner*—Devendra Kumar
*Attorney, Agent, or Firm*—Larson and Taylor

[57] ABSTRACT

The forward signal is submitted to a finite-impulse-response linear-prediction filter in order to determine a first residual signal of minimal energy. The return signal is submitted to a finite-impulse-response filter the coefficients of which are the same as those of the linear-prediction filter of the forward signal in order to determine a second residual signal. The ratio of the energies contained in the first and second residual signals is calculated. It is determined whether the return signal contains components other than the echo components from the forward signal by comparing the calculated ratio to a detection threshold.

18 Claims, 2 Drawing Sheets

METHOD AND DEVICE FOR ANALYSIS OF A RETURN SIGNAL AND ADAPTIVE ECHO CANCELLER INCLUDING APPLICATION THEREOF

BACKGROUND OF THE INVENTION

The present invention relates to a method and a device for detecting, in a return signal, the presence of components other than echo components from a forward signal. It finds a particular but not exclusive application in the field of adaptive echo cancellers.

Echo cancellers are used in bidirectional links. Their purpose is to cancel, or at least substantially to attenuate, in the signal flowing in one of the two directions (the return signal) the echo components from the signal flowing in the other direction (the forward signal) appearing in the region of the reception site of the forward signal. The echoes may be of acoustic origin, for example in the application to hands-free telephone instruments, or of electrical origin. The echo canceller usually includes a filter which models the echo paths in the region of the reception site of the forward signal. This filter receives the forward signal, and its output, which is an estimate of the echo components, is subtracted from the return signal.

In an adaptive echo canceller, the coefficients of the modeling filter are adapted in real time in order to minimize the energy of the residual return signal. When the return signal contains useful components and not only echo components from the forward signal, it is appropriate to fix the procedure of adapting the coefficients in order to avoid degrading the useful components and in order not to cause undesirable oscillations or divergences in the values of the coefficients.

However, the detection in the return signal of the presence of useful components other than the echo components from the forward signal proves to be a difficult problem. It is certainly possible to envisage calculations of correlations between the forward and return signals on the basis of which the detection could be performed. However, such a method implies considerable volumes of calculations, currently incompatible with practical applications.

An object of the present invention is to afford a solution to the above problem, which is realistic in terms of volume of calculations.

SUMMARY OF THE INVENTION

The invention proposes a method for detecting, in a return signal, the presence of components other than echo components from a forward signal, wherein the forward signal is submitted to a finite-impulse-response linear-prediction filter in order to determine a first residual signal of minimal energy, the return signal is submitted to a finite-impulse-response filter the coefficients of which are the same as those of the linear- prediction filter of the forward signal in order to determine a second residual signal, the ratio of the energies contained in the first and second residual signals is calculated, and it is determined whether the return signal contains components other than the echo components from the forward signal by comparing the calculated ratio with a detection threshold.

The detection is based on adapting the linear-prediction techniques normally used to resolve problems of information compression. When the return signal essentially contains only echo components from the forward signal, the forward signal and the return signal are spectrally similar, so that the ratio of the energies of the residual signals is substantially constant at a value depending on the amplitude of the response of the echo paths. When the return signal additionally contains useful components, the energy ratio deviates substantially from the preceding value, since the common coefficients of the filters, which are chosen to minimize the energy of the first residual signal, deviate from those which would minimize the energy of the second residual signal. The comparison of the calculated energy ratio to a detection threshold makes it possible therefore to discriminate between the two situations.

Having recourse to a linear-prediction technique implies a volume of calculation which is very much less than the direct determination of correlations between the forward signal and the return signal. The order of the linear prediction typically lies between 5 and 10.

For preference, the value of the detection threshold is adapted recursively on the basis of the calculated values of the energy ratio, the adapting of the detection threshold being interrupted when it is determined that the return signal contains components other than the echo components of the forward signal and/or when the presence of useful components is detected in the forward signal. This arrangement allows the detection process to be adapted to possible variations in the response of the echo paths.

A detection device for implementing the method according to the invention comprises a finite-impulse-response linear-prediction filter receiving the forward signal and producing a first residual signal of minimal energy, a second finite-impulse-response filter having the same coefficients as the linear-prediction filter of the forward signal, receiving the return signal and producing a second residual signal, means for calculating the ratio of the energies contained in the first and second residual signals, and means for comparing the calculated energy ratio to a detection threshold in order to determine whether the return signal contains components other than the echo components from the forward signal.

Another aspect of the present invention relates to an adaptive echo canceller, for attenuating, in a return signal, the echo components from a forward signal, comprising an adaptive filter for modeling the echo paths to which the forward signal is addressed and the output of which is subtracted from the return signal, which further comprises a detection device of the type defined above for detecting the presence in the return signal of components other than the echo components from the forward signal, the coefficients of the adaptive modeling filter being fixed when said detection device reveals the presence in the return signal of components other than the echo components from the forward signal.

DESCRIPTION OF PREFERRED EMBODIMENT

Figure 1:
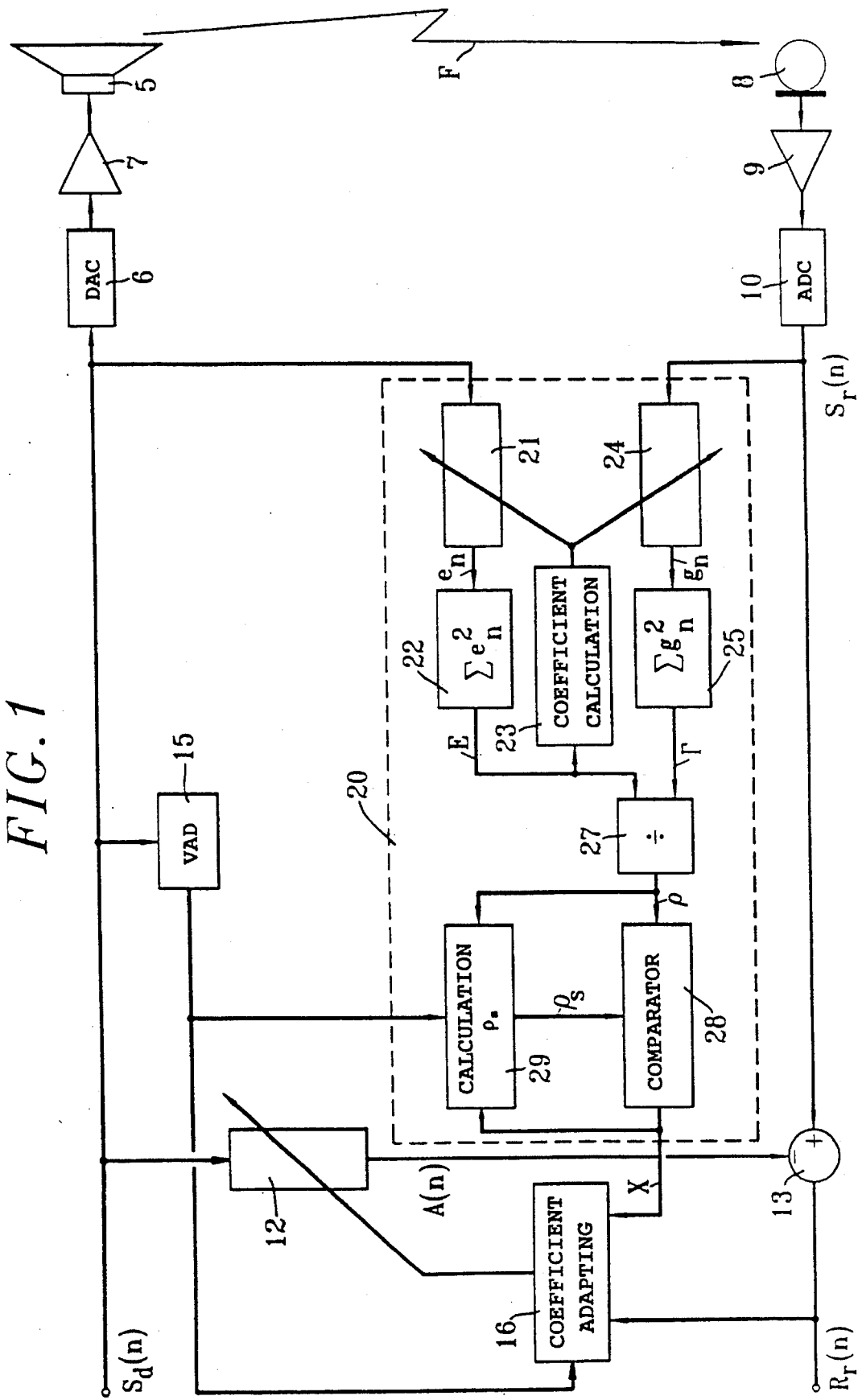
FIG. 1 is a block diagram of an adaptive echo canceller incorporating a detection device according to the invention.

The invention is described below in its particular, but not exclusive, application to an echo canceller of a telephone instrument of hands-free type. This instrument sends out and receives acoustic signals digitized at a sampling frequency of 8000 Hz for example. The forward signal $S_d(n)$ is addressed to the loudspeaker 5 of the instrument via a digital-analog converter 6 and an amplifier 7. The analog output signal from the microphone 8 of the instrument is amplified by the amplifier 9 then digitized by the converter 10 so as to form the digital return signal $S_r(n)$.

The echo canceller comprises a finite-impulse-response modeling filter 12 which receives the successive samples of the forward signal $S_d(n)$, and produces, as output, an estimate $A(n)$ of the echo from the forward signal. Each sample of the estimate $A(n)$ is subtracted from the corresponding sample of the return signal $S_r(n)$ by the subtractor 13 in order to form the residual return signal $R_r(n)$ devoid of echo. The coefficients of the filter 12 model the impulse response of the echo paths between the loudspeaker 5 and the microphone 8 (symbolized by the arrow F in FIG. 1). The filter 12 typically includes 2000 coefficients.

The coefficients of the filter 12 are updated adaptively during the communication, as indicated by the functional block 16 in FIG. 1. The adapting consists in minimizing the energy contained in the residual return signal $R_r(n)$. It can be done conventionally by a least-squares algorithm such as the gradient algorithm.

The echo canceller includes a voice activity detector 15 receiving the forward signal $S_d(n)$. The voice activity detector 15 serves to detect the presence of useful components other than noise in the forward signal. Voice activity detectors are well known in the field of acoustic signal processing. Examples thereof can be found in the articles "A voice activity detector based on cepstral analysis" by J. A. Haigh et al (Proc. Eurospeech 1993 - Berlin, Vol. 2, pages 1103–1106), "Speech enhancement using a soft-decision noise suppression filter" by R. J. Mc Aulay et al (IEEE Trans. ASSP, Vol. 28, No. 2, pages 137–147, April 1980), "Modification of piecewise LPC" by J. Roberts (MITRE Working paper WP-21752, May 1978), "Evaluation of linear and non-linear spectral subtraction methods for enhancing noisy speech" by A. Le Floc'h et al (ESCA, pages 131–134, November 1992), "Voice activity detection using a periodicity measure" by R. Tucker (IEEE Proc., Vol. 139, No. 4, August 1992), and "Speech/non-speech detection for voice response systems" by L. Mauuary et al (Proc. Eurospeech 1993 - Berlin, Vol. 2, pages 1097–1100). The voice activity detector 15 is used to control the adapting means 16, so that the coefficients of the filter 12 remain fixed when no useful component is detected in the forward signal $S_d(n)$.

The adapting of the coefficients no longer takes place when it is detected that the return signal $S_r(n)$ contains components other than the echo components from the forward signal. To this end, the invention makes provision to equip the echo canceller with a detection device 20 making it possible to determine whether the return signal does or does not contain components other than the echo components from the forward signal.

The detection device 20 comprises a linear-prediction filter 21 receiving the forward signal $S_d(n)$. The output samples $e_n$ from the filter 21 are given by:

$$e_n = S_d(n) + \sum_{i=1}^{p} a_i S_d(n-i)$$

where p designates the order of the linear prediction, and $a_i$ ($0 \leq i \leq p$) designates the coefficients of the linear prediction filter, with $a_0=1$ by convention. The energy E of the residual signal $e_n$ over a block of N samples of the forward signal is calculated in an accumulator 22 which forms the sum of the squares of the samples $e_n$ of the block. The coefficients of the filter 21 are calculated in such a way as to minimize this calculated energy E (functional block 23 in FIG. 1). The minimization algorithm used may also be an algorithm of least-squares type such as the gradient algorithm. The coefficients calculated at 23 are also used in another finite-impulse-response filter 24 which processes the return signal $S_r(n)$. The output samples $g_n$ from the filter 24 are thus expressed $$g_n = S_r(n) + \sum_{i=1}^{p} a_i S_r(n-i)$$

The energy $\Gamma$ contained in the block of N samples of the second residual signal $g_n$ is calculated in an accumulator 25 which forms the sum of the squares of the samples $g_n$ of the block.

At the end of each block of length N, a divider 27 calculates the energy ratio $\rho=\Gamma/E$. A comparator 28 compares the calculated value of the ratio $\rho$ to a detection threshold $\rho_s$. When $\rho>\rho_s$, it is determined that the return signal $S_r(n)$ contains components other than the echo components from the forward signal $S_d(n)$. The comparator 28 then addresses, to the means 16 of adapting the coefficients of the modeling filter 12 a signal X so that the coefficients of the filter 12 remain fixed when the device 20 has detected the presence in the return signal of components other than echo components from the forward signal. When $\rho \leq \rho_s$, the return signal $S_r(n)$ is deemed not to contain useful components, and the adapting of the coefficients of the modeling filter 12 takes place.

In the preferred version of the invention, the value of the detection threshold $\rho_s$ is adapted recursively depending on the calculated values of the ratio $\rho$, as shown diagrammatically by the calculation block 29 in FIG. 1. However, the adapting of the detection threshold $\rho_s$ is interrupted when it is determined that the return signal $S_r(n)$ contains components other than the echo components from the forward signal $S_d(n)$. It is indeed necessary to avoid the value of the threshold $\rho_s$ increasing inopportunely when the return signal contains useful components, which would degrade the detection performance of the device 20. For preference, the adapting of the detection threshold $\rho_s$ is also interrupted when the voice activity detector 15 reveals the presence of useful components in the forward signal $S_d(n)$. In this case, the detection threshold $\rho_s$ can be modified only when there are useful components neither in the forward signal nor in the return signal, that is to say, during periods of silence.

The calculation of the threshold $\rho_s$ includes a recursive estimation of the average value $\rho_{av}$ of the energy ratios $\rho$ calculated during the periods of adapting of the threshold $\rho_s$, with the aid of an exponential forgetting window:

$$\rho_{av} = \lambda \rho_{av} + (1-\lambda)\rho \quad (1)$$

where $\lambda$ designates a forgetting coefficient lying between 0 and 1. The maximum value $\rho_{max}$ of the ratios $\rho$ calculated during the periods of adapting of the threshold $\rho_s$ is also determined, by comparing the current value of $\rho$ to the value $\rho_{max}$ stored in the memory. The value of the threshold $\rho_s$ is then fixed when useful components are detected in one of the two signals:

$$\rho_s = \rho_{av} + \alpha(\rho_{max} - \rho_{av}) \quad (2)$$

where $\alpha$ designates a second coefficient lying between 0 and 1. By taking a value $\rho_s$ greater than $\rho_{av}$, the risks of false detection are minimized.

Various experiments carried out by the applicant have revealed that the optimum values of the coefficients α and λ lie between 0.8 and 0.9. These experiments have shown excellent detection performance with a linear-prediction model of order p=10 applied to blocks of non-overlapping samples of N=256 samples (namely 32 ms). The method has given satisfactory results for analysis blocks varying from N=64 to N=256 samples with linear-prediction orders p ranging from 5 to 10. Orders greater than 10 increase the calculation load without contributing significant improvements.

Figure 2:
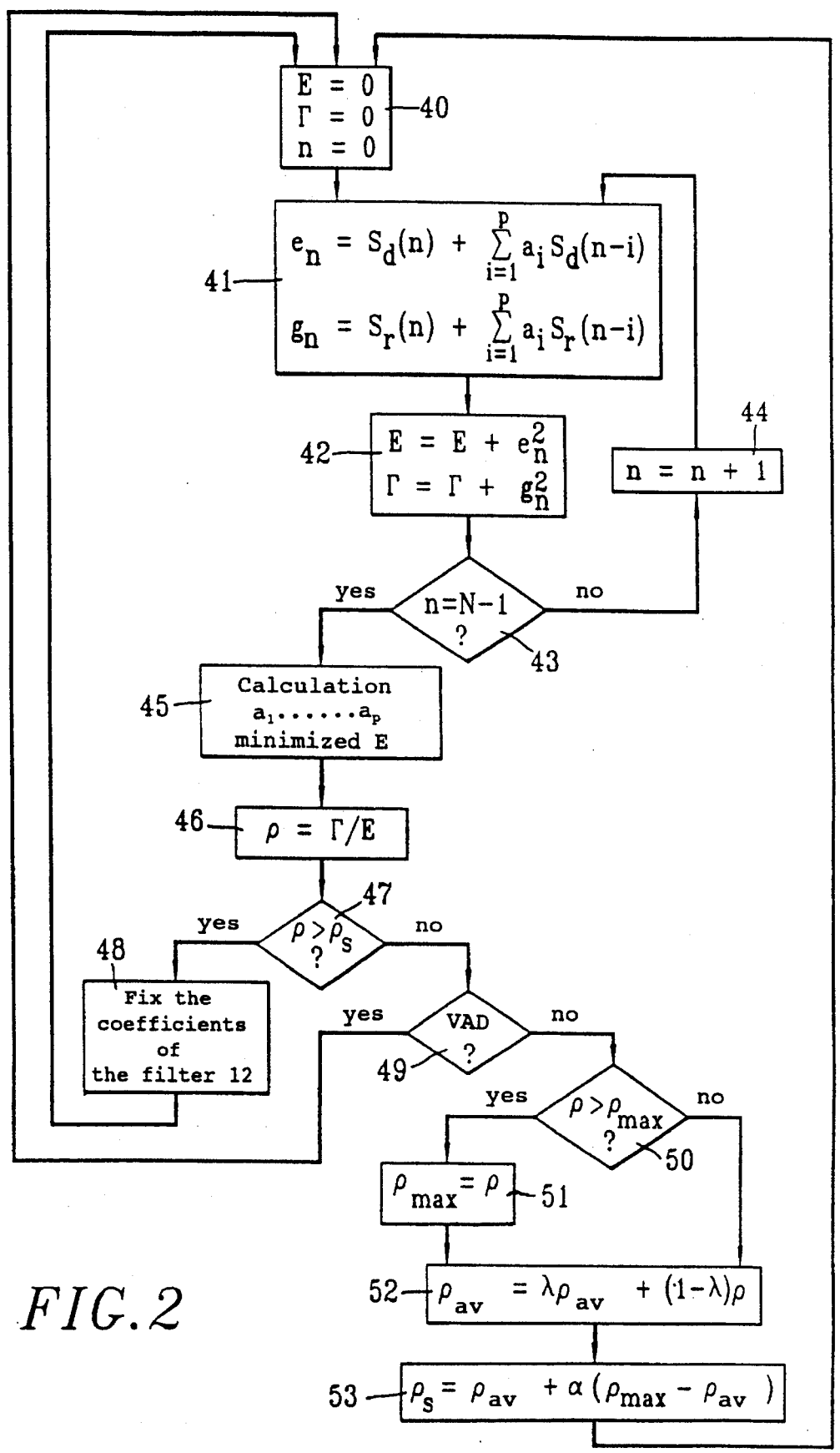
FIG. 2 is a flow chart illustrating the steps of a detection method according to the invention.

Physically, the echo canceller according to the invention will most often be produced by appropriately programing one or more signal processors (DSP). The programing of the parts other than the detection device 20 is conventional and will not be detailed further. The part corresponding to the device 20 can be produced in accordance with the flow chart represented in FIG. 2.

At the start of the process, the counters E, Γ and n are initialized to 0 (step 40). Next, upon each reception of a pair of samples $S_d(n)$, $S_r(n)$, the residual signals $e_n$ and $g_n$ are calculated (step 41), then the counters E, Γ are incremented respectively by $e_n^2$ and by $g_n^2$ (step 42). If the index n remains less than N−1 (test 43), it is incremented by one unit (step 44) in order to come back to step 41 upon reception of the following pair of samples. When n becomes equal to N−1, the current block is terminated, and step 45 is entered, for minimizing the residual energy E and for determining the coefficient $a_1, \ldots, a_p$ of the filters 21, 24. The ratio ρ=Γ/E is then calculated (step 46), then compared, at 47, to the threshold $ρ_s$. If $ρ>ρ_s$, it is decided that the return signal $S_r(n)$ contains components other than echo components from the forward signal, and the coefficients of the modeling filter 12 are fixed (step 48), before coming back to the initialization step 40 for processing of the following block. If $ρ≦ρ_s$, and if the voice activity detector 15 reveals useful components in the forward signal $S_d(n)$ (test 49), it is decided that there are useful components in the forward signal but not in the return signal, and the initialization step 40 is reentered for processing of the following block. In this case, the operation and the adapting of the coefficients of the modeling filter 12 are carried out normally. If $ρ≦ρ_s$ and if the voice activity detector 15 does not reveal useful components in the forward signal $S_d(n)$, it is decided that there are useful components neither in the forward signal nor in the return signal, and the process of adapting of the threshold $ρ_s$ is executed. This process commences with a comparison 50 between the calculated ratio ρ and the maximum ratio $ρ_{max}$ stored in the memory, followed, if $ρ>ρ_{max}$, by the updating 51 of the maximum $ρ_{max}$. Next, the average ratio $ρ_{av}$ is calculated according to the recursive formula (1) and stored in the memory (step 52), then the detection threshold $ρ_s$ is calculated according to the formula (2) (step 53), and the initialization step 40 is reentered for processing of the following block.

We claim:

1. A method for detecting, in a return signal, the presence of components other than echo components from a forward signal, comprising the steps of:

submitting the forward signal to a first finite-impulse-response linear-prediction filter in order to determine a first residual signal of minimal energy;

submitting the return signal to a second finite-impulse-response filter the coefficients of which are the same as those of the first finite-impulse-response filter in order to determine a second residual signal;

calculating the ratio of the respective energies of the first and second residual signals; and determining whether the return signal contains components other than echo components from the forward signal by comparing the calculated ratio with a detection threshold.

2. The method as claimed in claim 1, further comprising the step of recursively adapting the value of the detection threshold on the basis of the calculated values of said energy ratio, the adapting of the detection threshold being interrupted when it is determined that the return signal contains components other than the echo components of the forward signal.

3. The method as claimed in claim 2, wherein the adapting of the detection threshold is interrupted when presence of useful components is detected in the forward signal.

4. The method as claimed in claim 2, wherein, during each period of adapting of the detection threshold, the following steps are performed:

calculating an average $ρ_{av}$ of the successively calculated energy ratios ρ by a recursive formula of the form $$ρ_{av}=λρ_{av}+(1-λ)ρ$$

where λ designates a coefficient lying between 0 and 1;

calculating a maximum value $ρ_{max}$ of the energy ratios ρ calculated during the periods of adapting of the detection threshold; and calculating the value of the detection threshold $ρ_s$ by a formula of the form $$ρ_s=ρ_{av}+α(ρ_{max}-ρ_{av})$$

where α designates a coefficient lying between 0 and 1.

5. The method as claimed in claim 4, wherein the coefficients λ and α lie between 0.8 and 0.9.

6. The method as claimed in claim 1, wherein the order of the linear-prediction filter lies between 5 and 10.

7. A device for detecting the presence of components other than echo components from a forward signal in a return signal, comprising:

a first finite-impulse-response linear-prediction filter receiving the forward signal and producing a first residual signal of minimal energy;

a second finite-impulse-response filter having the same coefficients as the first finite-impulse-response filter, receiving the return signal and producing a second residual signal;

means for calculating the ratio of the energies contained in the first and second residual signals; and means for comparing the calculated energy ratio to a detection threshold in order to determine whether the return signal contains components other than echo components from the forward signal.

8. The device as claimed in claim 7, further comprising means for recursive adapting of the value of the detection threshold depending on the calculated values of the energy ratio, the operation of which is interrupted when the comparison means reveal that the return signal contains components other than the echo components from the forward signal.

9. The device as claimed in claim 8, wherein the operation of the adapting means is interrupted when useful components are detected in the forward signal.

10. The device as claimed in claim 8, wherein the adapting means are configured to determine the value of the detection threshold according to a formula of the type $$ρ_s=ρ_{av}+α(ρ_{max}-ρ_{av})$$

where $\rho_{av}$ is an average of the energy ratios $\rho$ calculated during the operating periods of the adapting means, obtained by a recursive formula of the form $$\rho_{av}=\lambda\rho_{av}+(1-\lambda)\rho$$

$\rho_{max}$ is the maximum value of the energy ratios $\rho$ calculated during the operating periods of the adapting means, and $\alpha$ and $\lambda$ are two coefficients lying between 0 and 1.

11. The device as claimed in claim 10, wherein the coefficients $\alpha$ and $\lambda$ lie between 0.8 and 0.9.

12. The device as claimed in claim 7, wherein the order of the linear-prediction filter lies between 5 and 10.

13. An adaptive echo canceller, for attenuating, in a return signal, echo components from a forward signal, comprising an adaptive filter for modeling echo paths, to which the forward signal is addressed and the output of which is subtracted from the return signal, and a detection device for detecting the presence in the return signal of components other than echo components from the forward signal, the coefficients of the adaptive modeling filter being fixed when said detection device reveals the presence in the return signal of components other than echo components from the forward signal, wherein said detection device comprises:

- a first finite-impulse-response linear-prediction filter receiving the forward signal and producing a first residual signal of minimal energy;
- a second finite-impulse-response filter having the same coefficients as the first finite-impulse-response filter, receiving the return signal and producing a second residual signal;
- means for calculating the ratio of the energies contained in the first and second residual signals; and
- means for comparing the calculated energy ratio to a detection threshold in order to determine whether the return signal contains components other than echo components from the forward signal.

14. The adaptative echo canceller as claimed in claim 13, wherein said detection device further comprises means for recursive adapting of the value of the detection threshold depending on the calculated values of the energy ratio, the operation of which is interrupted when the comparison means reveal that the return signal contains components other than the echo components from the forward signal.

15. The adaptative echo canceller as claimed in claim 14, wherein the operation of the adapting means is interrupted when useful components are detected in the forward signal.

16. The adaptative echo canceller as claimed in claim 14, wherein the adapting means are configured to determine the value of the detection threshold according to a formula of the type $\rho_s=\rho_{av}+\alpha(\rho_{max}-\rho_{av})$, where $\rho_{av}$ is an average of the energy ratios $\rho$ calculated during the operating periods of the adapting means, obtained by a recursive formula of the form $\rho_{av}=\lambda\rho_{av}+(1-\lambda)\rho$, $\rho_{max}$ is the maximum value of the energy ratios $\rho$ calculated during the operating periods of the adapting means, and $\alpha$ and $\lambda$ are two coefficients lying between 0 and 1.

17. The adaptative echo canceller as claimed in claim 16, wherein the coefficients $\alpha$ and $\lambda$ lie between 0.8 and 0.9.

18. The adaptative echo canceller as claimed in claim 13, wherein the order of the linear-prediction filter lies between 5 and 10.

* * * * *